(12) United States Patent
Perlin

(10) Patent No.: US 7,489,331 B2
(45) Date of Patent: Feb. 10, 2009

(54) METHOD AND APPARATUS FOR AN AUTOSTEREOSCOPIC DISPLAY HAVING A LENTICULAR LENSLET ARRAY

(75) Inventor: Kenneth Perlin, New York, NY (US)

(73) Assignee: New York University, New York, NY (US)

( * ) Notice: Subject to any disclaimer, the term of this patent is extended or adjusted under 35 U.S.C. 154(b) by 948 days.

(21) Appl. No.: 11/056,760

(22) Filed: Feb. 11, 2005

(65) Prior Publication Data

US 2005/0185051 A1 Aug. 25, 2005

Related U.S. Application Data

(60) Provisional application No. 60/546,060, filed on Feb. 19, 2004.

(51) Int. Cl.
*H04N 13/00* (2006.01)

(52) U.S. Cl. .......................................... 348/42; 348/51

(58) Field of Classification Search .................. 348/42, 348/51
See application file for complete search history.

(56) References Cited

U.S. PATENT DOCUMENTS

| 5,349,379 | A | 9/1994 | Eichenlaub |
| 5,712,732 | A | 1/1998 | Street |
| 6,215,590 | B1 | 4/2001 | Okano |
| 6,302,541 | B1 | 10/2001 | Grossmann |
| 7,233,347 | B2 * | 6/2007 | Jones et al. .................... 348/51 |

* cited by examiner

*Primary Examiner*—Allen Wong
(74) *Attorney, Agent, or Firm*—Ansel M. Schwartz

(57) ABSTRACT

An autostereoscopic imaging apparatus for an observer includes an eye tracking mechanism for determining a position of each eye of the observer. The apparatus includes a computer for constructing a right image and a left image of a scene. The left image being seen by the observer's left eye and the right image being seen by the observer's right eye when looking at the scene from the observer's location. The apparatus includes an image display on which the left image and the right image is displayed. The display in communication with the computer. The apparatus includes a lenticular lenslet array sheet through which a first portion of the scene displayed on the display passes and forms a first seamless image of the left image which is visible only to the observer's left eye, and through which a second portion of the scene displayed on the display passes through and forms a second seamless image of the right image which is visible only to the observer's right eye. Each lenslet having a pitch which is wide enough so that many pixels of the image on the display are seen magnified through the lenslet by the observer, wherein the observer whose eyes are actively tracked by the tracking mechanism can move around freely in a horizontal direction and a perpendicular direction relative to the display and see a seamless continuous image which is responsive to the movement of the observer relative to the display. A method for producing an autostereoscopic image of a scene for an observer.

15 Claims, 2 Drawing Sheets

METHOD AND APPARATUS FOR AN AUTOSTEREOSCOPIC DISPLAY HAVING A LENTICULAR LENSLET ARRAY

This application claims the benefit of U.S. Provisional Application No.: 60/546,060 filing date Mar. 19, 2004

FIELD OF THE INVENTION

The present invention is related to an autostereoscopic display. More specifically, the present invention is related to an autostereoscopic display having a lenticular lenslet array.

BACKGROUND OF THE INVENTION

Stereoscopic displays based on the use of lenticular lens arrays typically employ very narrow pitch lenslets, generally on the order of 0.02 inches in width. In this type of display, each eye of the observer sees one constant color across the width of one lenslet.

Behind each lenslet, a printed or computer-modulated display provides a set of closely spaced colored point sources, each separated from the one next to it by a small horizontal offset. The lenslet converts the relative horizontal position of each colored point source into a corresponding angular direction.

A stereoscopic impression of depth is imparted by the disparity between the color seen by the left eye and the color seen by the right eye, as both eyes regard the same lenslet from different angles.

When a computer display is used to provide the colored point sources, there is a trade-off between spatial resolution and angular resolution of the resulting 3D image: If each lenslet is required to provide a different color into N distinct angular directions, then the number of image pixels available to the eye of any given observer is correspondingly reduced by a factor of N.

A special case of lenslet based stereoscopic display is an autostereoscopic display that employs only two source pixels behind each lenslet. In this type of display the observer must maintain a relatively fixed head position, and must remain at a specific distance away from the display surface. An advantage of this type of autostereoscopic display is that the loss of resolution for this single properly positioned observer is only a factor of two (half of the source pixels are routed to the observer's left eye, and the other half are routed to the observer's right eye).

Given the advent of progressively more affordable methods to actively track the position of an observer's eyes, through the use of a video camera and computer software, it is now possible to radically rethink the use of lenticular lenslet arrays for autostereoscopic displays.

SUMMARY OF THE INVENTION

The present invention pertains to an autostereoscopic imaging apparatus for an observer. The apparatus comprises an eye tracking mechanism for determining a position of each eye of the observer. The apparatus comprises a computer for constructing a right image and a left image of a scene, the left image being seen by the observer's left eye and the right image being seen by the observer's right eye when looking at the scene from the observer's location. The apparatus comprises an image display on which the left image and the right image is displayed, the display in communication with the computer. The apparatus comprises a lenticular lenslet array sheet through which a first portion of the scene displayed on the display passes and forms a first seamless image of the left image which is visible only to the observer's left eye, and through which a second portion of the scene displayed on the display passes through and forms a second seamless image of the right image which is visible only to the observer's right eye, each lenslet having a pitch which is wide enough so that many pixels of the image on the display are seen magnified through the lenslet by the observer, wherein the observer whose eyes are actively tracked by the tracking mechanism can move around freely in a horizontal direction and a perpendicular direction relative to the display and see a seamless continuous image which is responsive to the movement of the observer relative to the display.

The present invention pertains to a method for producing an autostereoscopic image of a scene for an observer. The method comprises the steps of determining a position of each eye of the observer with an eye tracking mechanism. There is the step of constructing a right image and a left image of a scene with a computer, the left image being seen by the observer's left eye and the right image being seen by the observer's right eye when looking at the scene from the observer's location. There is the step of displaying the left image and the right image on an image display, the display in communication with the computer. There is the step of displaying a first portion of the scene displayed on the display through a lenticular lenslet array sheet which forms a first seamless image of the left image which is visible only to the observer's left eye, and displaying a second portion of the scene displayed on the display through the lenticular lenslet array which forms a second seamless image of the right image which is visible only to the observer's right eye, each lenslet having a pitch which is wide enough so that many pixels of the image on the display are seen magnified through the lenslet by the observer, wherein the observer whose eyes are actively tracked by the tracking mechanism can move around freely in a horizontal direction and a perpendicular direction relative to the display and see a seamless continuous image which is responsive to the movement of the observer relative to the display.

The present invention pertains to an autostereoscopic imaging apparatus for an observer. The apparatus comprises an eye tracking mechanism for determining a position of each eye of the observer The apparatus comprises a computer for constructing a right image and a left image of a scene. The left image being seen by the observer's left eye and the right image being seen by the observer's right eye when looking at the scene from the observer's location. The apparatus comprises an active display screen on which the left image and the right image is displayed. The display in communication with the computer. The apparatus comprises a lenticular lenslet array sheet through which a first portion of the scene displayed on the display passes and forms a first seamless image of the left image which is visible only to the observer's left eye, and through which a second portion of the scene displayed on the display passes through and forms a second seamless image of the right image which is visible only to the observer's right eye. The computer providing active adaptation of the position and local magnification of two interleaved images, one each for the observer's left and right eyes, respectively, positioned on the active display screen disposed behind the lenslet array, so as to present an image to each eye of the observer which is optimally high resolution for the observer's current position.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
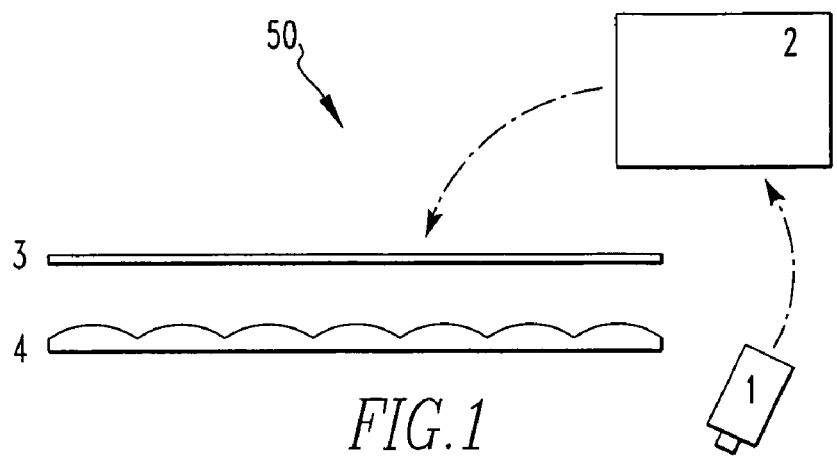
FIG. 1 is a block diagram of the present invention.

Referring now to the drawings wherein like reference numerals refer to similar or identical parts throughout the several views, and more specifically to FIG. 1 thereof, there is shown an autostereoscopic imaging apparatus for an observer. The apparatus 50 comprises an eye tracking mechanism 1 for determining a position of each eye of the observer. The apparatus comprises a computer 2 for constructing a right image and a left image of a scene. The left image being seen by the observer's left eye and the right image being seen by the observer's right eye when looking at the scene from the observer's location. The apparatus 50 comprises an image display 3 on which the left image and the right image is displayed. The display 3 is in communication with the computer 2. The apparatus 50 comprises a lenticular lenslet array sheet 4 through which a first portion of the scene displayed on the display 3 passes and forms a first seamless image of the left image which is visible only to the observer's left eye, and through which a second portion of the scene displayed on the display 3 passes through and forms a second seamless image of the right image which is visible only to the observer's right eye. Each lenslet having a pitch which is wide enough so that many pixels of the image on the display 3 are seen magnified through the lenslet by the observer, wherein the observer whose eyes are actively tracked by the tracking mechanism 1 can move around freely in a horizontal direction and a perpendicular direction relative to the display 3 and see a seamless continuous image which is responsive to the movement of the observer relative to the display 3.

Preferably, each lenslet displays 15or more pixels. The pitch of each lenslet is preferably between 6 mm and 65 mm wide. Preferably, between the display and the lenslet array sheet there is a gap. The presence of the gap preferably insurers that the display can always present a distinct image to each eye, with no display pixels in common between the image targeted for the observer's left eye and the image targeted for the observer's right eye.

Preferably, the computer by horizontally magnifying the image displayed at each stripe, each eye can be made to perceive a single seamless image, with no gaps or distortions in the perceived image at the boundary between successive lenslets. The horizontal magnification is preferably greater than 2.0, because each eye receives less than 50 percent of the horizontal width of that portion of the display which is located behind each lenslet.

Preferably, the lenslet array sheet has a plane, the pitch W and lenslet array sheet of focal length F which is separated from the display by a gap distance G, with the observer's eyes both a distance D away from the plane and $G/(W/2)=(F+D)/E$. The computer preferably constructs the right image and the left image of a virtual scene. The display can be either a CRT or an LCD display or a rear-projection screen or a front-projection screen.

The present invention pertains to a method for producing an autostereoscopic image of a scene for an observer. The method comprises the steps of determining a position of each eye of the observer with an eye tracking mechanism. There is the step of constructing a right image and a left image of a scene with a computer, the left image being seen by the observer's left eye and the right image being seen by the observer's right eye when looking at the scene from the observer's location. There is the step of displaying the left image and the right image on an image display, the display in communication with the computer. There is the step of displaying a first portion of the scene displayed on the display through a lenticular lenslet array sheet which forms a first seamless image of the left image which is visible only to the observer's left eye, and displaying a second portion of the scene displayed on the display through the lenticular lenslet array which forms a second seamless image of the right image which is visible only to the observer's right eye, each lenslet having a pitch which is wide enough so that many pixels of the image on the display are seen magnified through the lenslet by the observer, wherein the observer whose eyes are actively tracked by the tracking mechanism can move around freely in a horizontal direction and a perpendicular direction relative to the display and see a seamless continuous image which is responsive to the movement of the observer relative to the display.

Preferably, the constructing step includes the step of constructing the right image and the left image of a virtual scene with the computer.

The present invention pertains to an autostereoscopic imaging apparatus for an observer. The apparatus comprises an eye tracking mechanism for determining a position of each eye of the observer. The apparatus comprises a computer for constructing a right image and a left image of a scene. The left image being seen by the observer's left eye and the right image being seen by the observer's right eye when looking at the scene from the observer's location The apparatus comprises an active display screen on which the left image and the right image is displayed. The display in communication with the computer. The apparatus comprises a lenticular lenslet array sheet through which a first portion of the scene displayed on the display passes and forms a first seamless image of the left image which is visible only to the observer's left eye, and through which a second portion of the scene displayed on the display passes through and forms a second seamless image of the right image which is visible only to the observer's right eye. The computer providing active adaptation of the position and local magnification of two interleaved images, one each for the observer's left and right eyes, respectively, positioned on the active display screen disposed behind the lenslet array, so as to present an image to each eye of the observer which is optimally high resolution for the observer's current position.

The term "responsive to the movement of the observer relative to the display" means that as the observer varies his physical location with respect to the display, the object represented in the display can remain in a visually consistent apparent location in space, as perceived by each of the two eyes of the observer.

In the present invention, rather than employing the use of a fine-pitched lenticular lenslet array, a large-pitched lenticular lenslet array is interposed in front of a computer-modulated source display. The pitch of each lenslet can be as wide as the human interocular distance E (about 65 mm) or as small as 6 mm. The key innovation is to make the pitch of each lenticular lenslet wide enough so that many pixels of the source image can be seen through it, somewhat magnified, by each eye of the observer. In this arrangement, as the observer varies in position, the locations of the observer's eyes are used to calculate by computer an alternating stripe pattern consisting of portions of the left and right image, where each image stripe is horizontally magnified around that stripe's center position. The result is that each eye of the observer sees only a single seamless image.

The result is that an observer whose eye positions are actively tracked can move around freely, not just side-to-side but also through a large range of distances away from the display screen.

The new method works with all existing display technologies, including LCD panel displays, plasma screens, CRT monitors, and all kinds of rear projection displays, including CRT, LCOS and DLP. The only modification required to the display screen is the interposition of a lenslet array sheet between the display screen and the observer. This lenslet array sheet can be made of inexpensive plastic. This simplicity and lack of expense, even for use with large format displays, enables the new method to make some applications practical for the first time, such as inexpensive large-format teleconferencing in which a participant is allowed free head movement.

The lenticular lenslet array can be manufactured out of clear plastic by any one of a number of existing commercial manufacturers who specialize in custom plastic optics. One such company is Reflexite, which is located in Rochester, N.Y. Each lenslet is large in width, relative to the standard width of lenticular lenslets in lenticular lenslet arrays. Typically, a lenticular lenslet is designed to represent a single pixel of brightness. For this reason, each lenslet in most current commercial lenslet arrays is on the order of 0.02 inches in width. In contrast, each lenslet in the new method is used to view many pixels. For this reason, each lenslet is wide enough to display many pixels for each eye, typically 15 or more. The width of a lenslet in the new method is typically 0.3 inches to 2.0 inches. The display screen is optimally high resolution. Optimally high resolution means the greatest possible number of pixels per inch given the number of pixels in the display screen. An optimally high resolution display uses all the pixels available in the underlying display screen to create an image for each eye of the observer.

Also, unlike previous lenticular based methods, the new method does not require a high precision correspondence between the size and location of pixels on the source display screen and the lenslets on the lenslet sheet. This difference from previous methods makes the new method much better suited for rear-projection displays, for which such high precision positioning can be very difficult and expensive.

The Physical Parts of the Invention: (See FIG. 1)
  Eye position tracking device 1
  Digital computer 2
  Image display device 3
  Lenticular lenslet array sheet 4

The Step-By-Step Internal Operation of the Mechanism:
  The eye position tracker (1) determines the position of each of the observer's two eyes.
  The digital computer (2) constructs two images of a virtual scene: a LEFT IMAGE that would be seen by the observer's left eye and a RIGHT IMAGE that would be seen by the observer's right eye, when looking at the scene from the observer's current location.
  The two images are processed and combined into a single horizontally interleaved image, as per the mathematical formulas below under "Best embodiment".
  The result is displayed onto the Image display mechanism (3).
  A first portion of the displayed image passes through the lenticular array sheet (4) and forms a seamless image of the LEFT IMAGE which is visible only to the observer's left eye. A second portion of the displayed image passes through the lenticular array sheet and forms a seamless image of the RIGHT IMAGE which is visible only to the observer's right eye.

The Step-By-Step Operation that the User Sees:
  The observer looks at the screen.
  The observer's left eye sees a virtual scene as it would be perceived if the observer were looking at a corresponding physical scene from the vantage point of the left eye. Likewise, the observer's right eye sees a virtual scene as it would be perceived if the observer were looking at a corresponding physical scene from the vantage point of the right eye.
  As the observer's head position changes in any direction, including up/down, left/right, or nearer/farther to the display screen, the observed virtual scene appears to remain in the proper relationship to the observer, as though the observer is observing a scene which is physically present.

BEST EMBODIMENT

Figure 2:
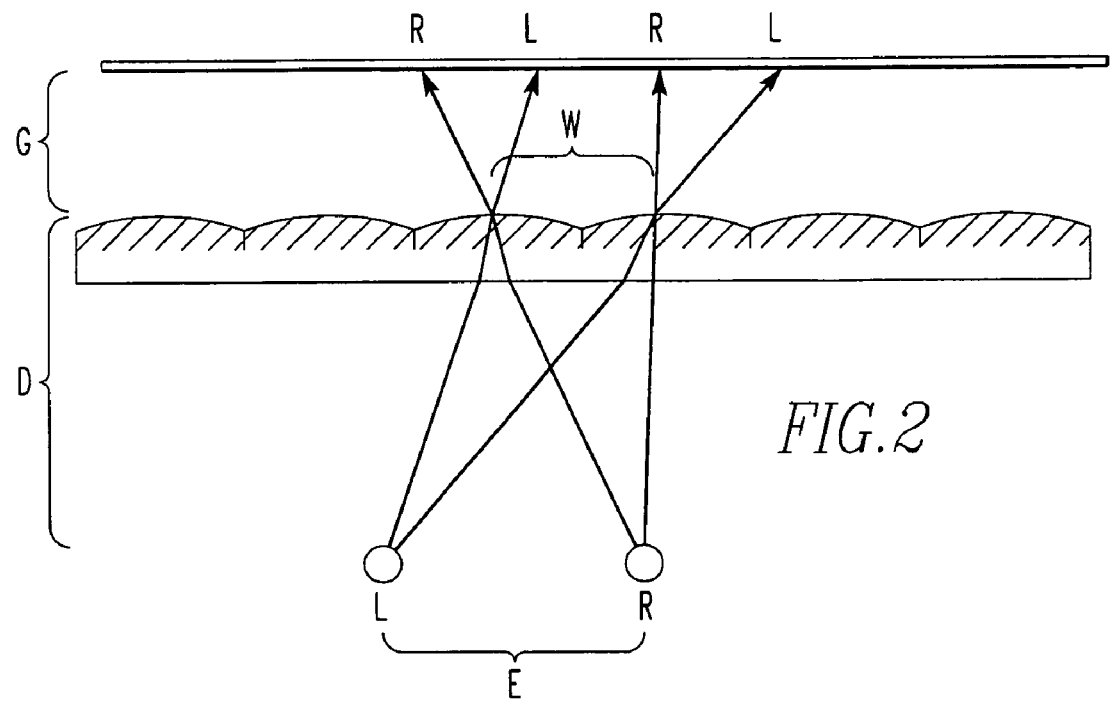
FIG. 2 is a schematic representation of the observer's left and right eyes with respect to the display.

The geometric elements of the display consist of a display SCREEN, a lenticular lenslet ARRAY with lenslet pitch W and lenslet focal length F which is separated from the screen by a distance G. The observer's LEFT and RIGHT eyes are both at distance D away from the plane of the lenslet ARRAY. See FIG. 2.

In order to describe the desired geometric relationship between the display screen, the lenticular lens array and the observer's position in the new method, it is useful to describe a hypothetical scenario in which an image of alternating vertical red and green stripes is displayed on the SCREEN.

The following question is now solved: At what values of gap G and distance D will the observer's LEFT eye sees exactly the entire green stripe, whereas the observer's RIGHT eye sees exactly the entire red stripe, with no unused display area between successive stripes?

Figure 3:
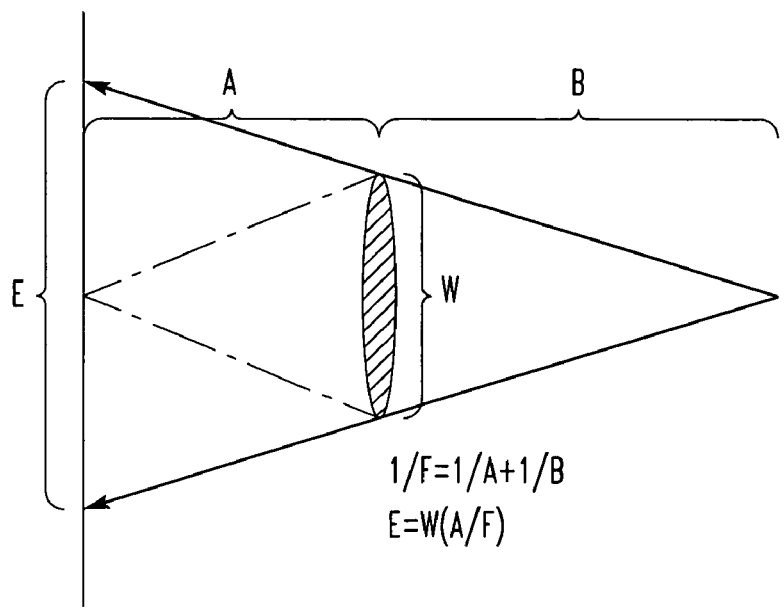
FIG. 3 is a schematic representation of the proportional projection properties of optical lenses.

A Proportional Projection geometric property of optical lenses is made use of: Given a convex lens oriented from left to right, located at x=0 and having width W and focal length F, then when light from a point to the left of the lens, at x=−A, is refocused to the right of the lens, at x=+B (where B may be computed by $1/F=1/A+1/B$), then the projection of the point at x=+B of the lens aperture onto the plane at x=−A is of size $E=W(A/F)$ (see FIG. 3).

This relationship is proved as follows: $1/F=1/A+1/B$ and $A/B=(E-W)/W \rightarrow ?1/F+1/A+(E-W)/(AW) \rightarrow ?1/F=E/(AW)$.

Figure 4:
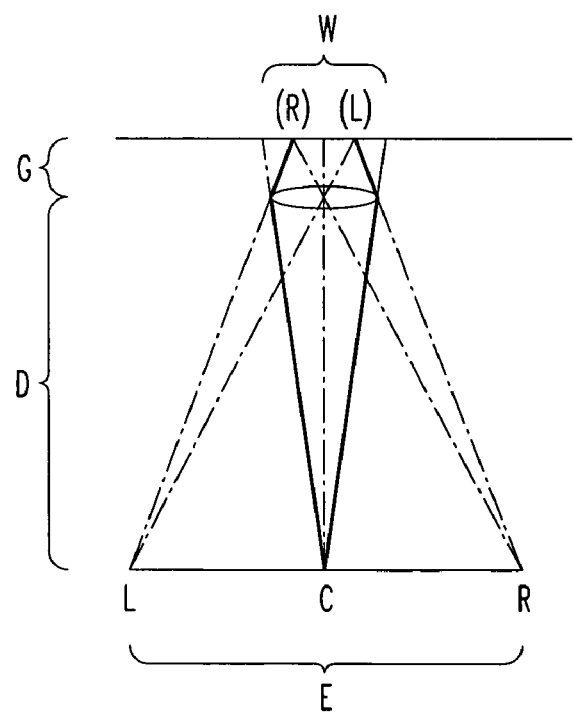
FIG. 4 is a schematic representation establishing desired values of the observer's left and right eyes with respect to the display.

If an imaginary eye point is placed between the left and right eyes, and a lenslet is placed directly in front of this point, then we can use the Proportional Projection property to show that: $E=W(D/F)$ and therefore that $D=F(E/W)$. Also, by considering lines that pass from the left and right eyes, respectively, through the center of this lenslet and then onto the screen, we can, by similar triangles, establish equal ratios: $G/(W/2)=(G+D)/E$ (see FIG. 4).

These equations suffice to establish values for G and D, given values for E, F and W.

If the observer distance is maintained to at least 1.1×D, then there will be a slight gap on the screen separating the visible areas of successive left and right stripes. At this distance, the observer will be able to see a portion of each stripe which consists of almost the entire stripe width, with a small gap at every junction between successive stripes. If distance from the display SCREEN to the lenticular lenslet ARRAY is also increased slightly, to approximately 1.05×G, then there will also be a slight gap between successive stripes when the observer is a much larger distances of on the order of 3D or more.

With a focal length of F, a lens pitch of W, and a screen-to-lenslet gap of 1.05×G, then for any observer position such that the distance from the observer to the lenslet array is at least 1.1×D it is possible to construct a set of alternating vertical stripes such that:

The observer's left eye sees only even numbered stripes;
The observer's right eye sees only odd numbered stripes;
There is a gap on the display screen between the rightmost visible edge on of any stripe (a stripe which is visible to only one eye) the leftmost visible edge of the stripe to the immediate right of that stripe (a stripe which is visible only to the other eye).

The presence of these gaps ensures that the display can always present a distinct image to each eye, with no display-screen pixels in common between the image targeted for the observer's left eye and the image targeted for the observer's right eye.

By horizontally magnifying the image displayed at each stripe, each eye can be made to perceive a single seamless image, with no gaps or distortions in the perceived image at the boundary between successive lenslets. The horizontal magnification is greater than 2.0, because each eye perceives less than 50% of the horizontal width of that portion of the display screen which is located behind each lenticular lenslet. The eye perceives this narrow portion of the display screen as being wide enough to fill the entire width of the lenslet, due to the (greater than two) factor of horizontal magnification.

The further away the observer is from the screen, the smaller will be the portion of each stripe that is visible to the observer, the greater will be the horizontal image magnification required at each stripe, and consequently the lower will be the horizontal image resolution which can be presented by the display to an observer at that position.

The display itself, situated on the far side of the lenticular lens array from the observer, can be either an actively switched direct view display mechanism, such as a CRT or LED display, or else a rear-projection screen, or else a front-projection screen. The latter embodiment has the advantage over a rear projection screen that it allows a large format display area, without requiring either a space behind the display screen for a projection path.

The technique is able to use front-projection to provide the interleaved image source, by employing at least two different projectors whose lens apertures are horizontally separated from each other. Both of these two projectors project through the lenticular lenslet array onto a diffuse reflecting surface on the far side of the lenticular lens array in such a way that the two images projected by each lenslet overlap. This overlap allows edge-blending to be done within those portions of the projected images that reach a common area of the diffuse surface. The result is a single combined image source at the diffuse reflecting surface behind the lenticular lenslet array. This single image source is utilized as in all other embodiments of the technique. For any given observer's head position, portions of this image source that are seen by the observer's left eye will originate from each of the two projectors. Similarly, portions of this image source that are seen by the observer's right eye will originate from each of the two projectors.

An extension of the foregoing employs a two dimensional tiling of lenslets, in either a regular rectangular or a regular hexagonal pattern. In this embodiment, the tracked observer can be at any orientation with respect to the display screen. Therefore, this extension enables the technique to be used as a horizontally oriented display, which can serve as a floor, table surface or ceiling.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An autostereoscopic imaging apparatus for an observer comprising:
   an eye tracking mechanism for determining a position of each eye of the observer;
   a computer for constructing a right image and a left image of a scene, the left image being seen by the observer's left eye and the right image being seen by the observer's right eye when looking at the scene from the observer's location;
   an image display on which the left image and the right image is displayed, the display in communication with the computer; and
   a lenticular lenslet array sheet through which a first portion of the scene displayed on the display passes and forms a first seamless image of the left image which is visible only to the observer's left eye, and through which a second portion of the scene displayed on the display passes through and forms a second seamless image of the right image which is visible only to the observer's right eye, each lenslet having a pitch which is wide enough so that many pixels of the image on the display are seen magnified through the lenslet by the observer, wherein the observer whose eyes are actively tracked by the tracking mechanism can move around freely in a horizontal direction and a perpendicular direction relative to the display and see a seamless continuous image which is responsive to the movement of the observer relative to the display.

2. An apparatus as described in claim 1 wherein each lenslet displays 15 or more pixels.

3. An apparatus as described in claim 2 wherein the pitch of each lenslet is between 6 mm and 65 mm wide.

4. An apparatus as described in claim 3 wherein between the display and the lenslet array sheet there is a gap.

5. An apparatus as described in claim 4 wherein the presence of the gap insurers that the display can always present a distinct image to each eye, with no display pixels in common between the image targeted for the observer's left eye and the image targeted for the observer's right eye.

6. An apparatus as described in claim 5 wherein the computer by horizontally magnifying the image displayed at each stripe, each eye can be made to perceive a single seamless image, with no gaps or distortions in the perceived image at the boundary between successive lenslets.

7. An apparatus as described in claim 6 wherein the horizontal magnification is greater than 2.0, because each eye receives less than 50 percent of the horizontal width of that portion of the display which is located behind each lenslet.

8. An apparatus as described in claim 7 wherein the lenslet array sheet has a plane, the pitch W and lenslet array sheet of focal length F which is separated from the display by a gap distance G, with the observer's eyes both a distance D away from the plane and $G/(W/2)=(F+D)/E$.

9. An apparatus as described in claim 8 wherein the display is either a CRT or an LCD display.

10. An apparatus as described in claim 8 wherein the display is a rear-projection screen.

11. An apparatus as described in claim 8 wherein the display includes a front-projection screen.

12. An apparatus as described in claim 8 wherein the computer constructs the right image and the left image of a virtual scene.

13. A method for producing an autostereoscopic image of a scene for an observer comprising the steps of:
   determining a position of each eye of the observer with an eye tracking mechanism;
   constructing a right image and a left image of a virtual scene with a computer, the left image being seen by the observer's left eye and the right image being seen by the observer's right eye when looking at the scene from the observer's location;
   displaying the left image and the right image on an image display, the display in communication with the computer; and
   displaying a first portion of the scene displayed on the display through a lenticular lenslet array sheet which forms a first seamless image of the left image which is visible only to the observer's left eye, and displaying a second portion of the scene displayed on the display through the lenticular lenslet array which forms a second seamless image of the right image which is visible only to the observer's right eye, each lenslet having a pitch which is wide enough so that many pixels of the image on the display are seen magnified through the lenslet by the observer, wherein the observer whose eyes are actively tracked by the tracking mechanism can move around freely in a horizontal direction and a perpendicular direction relative to the display and see a seamless continuous image which is responsive to the movement of the observer relative to the display.

14. A method as described in claim 13 wherein the constructing step includes the step of constructing the right image and the left image of a virtual scene with the computer.

15. An autostereoscopic imaging apparatus for an observer comprising:
   an eye tracking mechanism for determining a position of each eye of the observer;
   a computer for constructing a right image and a left image of a virtual scene, the left image being seen by the observer's left eye and the right image being seen by the observer's right eye when looking at the scene from the observer's location;
   an active display screen on which the left image and the right image is displayed, the display in communication with the computer; and
   a lenticular lenslet array sheet through which a first portion of the scene displayed on the display passes and forms a first seamless image of the left image which is visible only to the observer's left eye, and through which a second portion of the scene displayed on the display passes through and forms a second seamless image of the right image which is visible only to the observer's right eye, the computer providing active adaptation of the position and local magnification of two interleaved images, one each for the observer's left and right eyes, respectively, positioned on the active display screen disposed behind the lenslet array, so as to present an image to each eye of the observer which is optimally high resolution for the observer's current position.

* * * * *